United States Patent
Yamazaki et al.

(10) Patent No.: US 6,867,938 B2
(45) Date of Patent: Mar. 15, 2005

(54) DIGITAL INFORMATION REPRODUCING APPARATUS USING ROTARY MAGNETIC HEADS

(75) Inventors: Shigeru Yamazaki, Yokohama (JP); Kenmei Masuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 227 days.

(21) Appl. No.: 10/301,472

(22) Filed: Nov. 20, 2002

(65) Prior Publication Data

US 2003/0197966 A1 Oct. 23, 2003

(30) Foreign Application Priority Data

Apr. 23, 2002 (JP) ....................................... 2002-120219

(51) Int. Cl.[7] ................................................. G11B 5/09
(52) U.S. Cl. .......................................... 360/46; 360/67
(58) Field of Search ........................... 360/132, 67, 46, 360/25, 31, 64, 61, 51, 281, 32, 66

(56) References Cited

U.S. PATENT DOCUMENTS 6,243,240 B1 * 6/2001 Ozue et al. .............. 360/281.4

6,717,761 B2 * 4/2004 Yamazaki et al. ............ 360/46

FOREIGN PATENT DOCUMENTS

JP          10-177924          6/1998

* cited by examiner

Primary Examiner—Alan T. Faber
(74) Attorney, Agent, or Firm—Townsend and Townsend and Crew LLP

(57) ABSTRACT

A digital information reproducing apparatus using rotary heads that reproduces digital information signals recorded on a magnetic tape using magneto resistive heads installed on a rotary drum. The apparatus includes, in the fixed side of the apparatus, a magnetic tape checking circuit that checks the type of the magnetic tape; and a control signal generation circuit that generates a control signal for controlling the gain of a reproduction amplifier circuit; and on the rotary drum, a decoder circuit that identifies the control signal transmitted from the control signal generation circuit. The control signal generation circuit generates the control signal based on a checking result given by the magnetic tape checking circuit, and the decoder circuit identifies the transmitted control signal to control the gain of the reproduction amplifier circuit.

10 Claims, 4 Drawing Sheets

DIGITAL INFORMATION REPRODUCING APPARATUS USING ROTARY MAGNETIC HEADS

BACKGROUND OF THE INVENTION

1. Field of the Invention

The present invention relates to a digital information reproducing apparatus using rotary magnetic heads that reproduces digital information signals using magnetic heads installed on a rotary drum, in particular, using Magneto Resistive Heads.

2. Description of the Related Art

The recording capacity of digital storage, including digital video tape recorders (VTR), hard disks, and optical discs, is becoming larger and larger. To increase the capacity, the recording rate is increased and the recording track width is reduced. As a reproducing head, a Magneto Resistive Head (hereinafter called an MR head) is used to maintain an S/N margin compatible with high-density recording.

An MR head, which detects a change in the resistance to sense magnetic information signals generated from a recording medium such as a magnetic tape or a magnetic disk, needs to have a detection current (sense current) supplied. Because the change in resistance is non-linear with respect to the input magnetic field, a bias current is required to keep the operation point of the MR head in an area where the change becomes almost linear. Recent MR heads are designed to receive those currents as a common current (hereinafter, those currents are collectively called a bias current). When this MR head is applied to a rotary head apparatus, it is required to install a bias current circuit, such as the one described above, and a reproduction amplifier circuit on the rotary drum.

The technology for installing an MR head on a rotary drum and controlling the bias current determining the operation point of the MR head is disclosed, for example, in the JP-A-10-177924. The publication discloses a technology for changing the bias current according to the degree of wear on the MR head.

The conventional technology described above does not consider compatibility required to reproduce data from media recorded at different densities. That is, a magnetic disk unit, in which magnetic disks and magnetic heads are integrally configured, does not assume the reproduction of data from a disk medium on which data was recorded by other units. On the other hand, a magnetic tape unit can reproduce data from a tape medium on which data was recorded by some other unit. However, a magnetic tape unit compatible with high-density recording must be able to reproduce data from a magnetic tape on which data was recorded by a conventional low-density unit.

Because the magnetic layer of a high-density recording tape is thin to improve the characteristic in the short wavelength area, the level of a signal reproduced from a high-density recording tape is generally low as compared with that of a signal reproduced from a conventional low-density recording tape. In addition, the reproduction amplifier circuit must be used in a high-gain area to minimize the effect of noise components of the amplifier itself and external noises. Therefore, when a low-density recording tape is reproduced on a unit designed for a high-density recording tape, the level of the reproduced signal becomes too high and the dynamic range of the reproduction amplifier circuit is exceeded. This involves waveform clipping or secondary harmonic distortion, resulting in degradation in the system error rate. In addition, even if an equivalent-density tape is used, the output level becomes too high when the MR head has worn; in this case, the problem similar to those described above occurs.

SUMMARY OF THE INVENTION

It is an object of the present invention to provide a digital information reproducing apparatus using rotary magnetic heads that has a reproduction system capable of giving stable, good signals independently of a tape type or head wear.

To achieve the above object, an apparatus according to the present invention reproduces an information signal recorded on a magnetic tape, wherein magneto resistive heads, a current supply circuit supplying an operating current to the magneto resistive heads, and a reproduction amplifier circuit amplifying a signal reproduced by the magneto resistive heads are installed on a rotary drum. In a fixed side of the apparatus, a magnetic tape checking circuit that, when a magnetic tape to be reproduced is mounted on the apparatus, checks an open/close status of detection holes on a tape cartridge to determine a type of the magnetic tape, the tape cartridge storing therein the magnetic tape; and a control signal generation circuit that generates a control signal for controlling a gain of the reproduction amplifier circuit are provided. On the rotary drum, a decoder circuit that identifies data of the control signal transmitted from the control signal generation circuit is provided. The control signal generation circuit generates the control signal based on a checking result given by the magnetic tape checking circuit, and the decoder circuit identifies the transmitted control signal to control the gain of the reproduction amplifier circuit.

An apparatus according to the present invention comprises, in a fixed side of the apparatus, a transmitted signal clock detection circuit that detects a clock frequency of a signal transmitted from the reproduction amplifier circuit; and a control signal generation circuit that generates a control signal for controlling a gain of the reproduction amplifier circuit. On the rotary drum, the apparatus comprises a decoder circuit that identifies data of the control signal transmitted from the control signal generation circuit. The control signal generation circuit generates the control signal based on a detection result given by the transmitted signal clock detection circuit, and the decoder circuit identifies the transmitted control signal to control the gain of the reproduction amplifier circuit.

An apparatus according to the present invention comprises, in a fixed side of the apparatus, a signal level detection circuit that detects an output level of a signal transmitted from the reproduction amplifier circuit; and a control signal generation circuit that generates a control signal for controlling a gain of the reproduction amplifier circuit. On the rotary drum, the apparatus comprises a decoder circuit that identifies data of the control signal transmitted from the control signal generation circuit. The control signal generation circuit generates the control signal based on a detection result given by the signal level detection circuit, and the decoder circuit identifies the transmitted control signal to control the gain of the reproduction amplifier circuit.

In the apparatus, at least two the magneto resistive heads are installed on the rotary drum, diametrically opposed each other, and the magnetic tape is wound around the rotary drum approximately 180 degrees and, at the same time, the control signal generation circuit generates the control signal for each period for which the magneto resistive heads are in touch with the magnetic tape and the decoder circuit controls the gain of the reproduction amplifier circuit for each of the magneto resistive heads that reproduce the tape.

BRIEF DESCRIPTION OF THE SEVERAL VIEWS OF THE DRAWING

These and other objects, features and advantages of the present invention will become more readily apparent from the following detailed description when taken in conjunction with the accompanying drawing wherein.

DETAILED DESCRIPTION OF THE INVENTION

Some embodiments of the present invention will be described in detail below.

Figure 1:
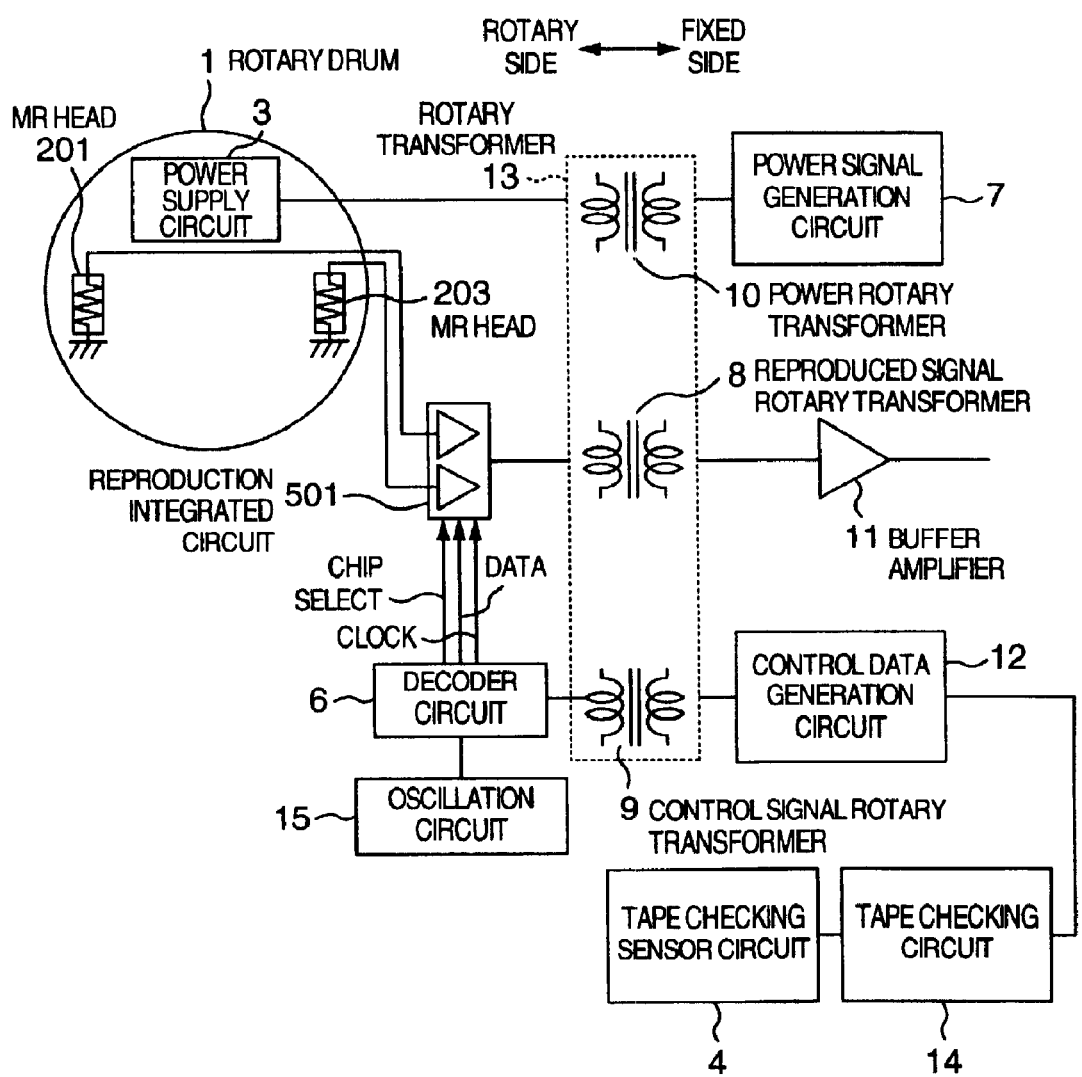
FIG. 1 is a block diagram showing an embodiment of a digital information reproducing apparatus using rotary magnetic heads according to the present invention.

FIG. 1 is a block diagram showing an embodiment of a digital information reproducing apparatus using rotary magnetic heads according to the present invention. Referring to FIG. 1, the rotary side comprises MR heads 201 and 203, a power supply circuit 3, a reproduction integrated circuit 501, a decoder 6, and an oscillating circuit 15, all of which are installed on a rotary drum 1. The fixed side comprises a power signal generation circuit 7, a buffer amplifier 11, a control data generation circuit 12, a tape checking sensor circuit 4, and a tape checking circuit 14. A rotary transformer 13 comprises a power rotary transformer 10, a reproduced signal rotary transformer 8, and a control signal rotary transformer 9.

A pair of MR heads 201 and 203, installed on the rotary drum 1 and diametrically opposed each other, read a signal from a magnetic tape (not shown) wound approximately 180 degrees in the drum rotation direction. This reproduced signal is amplified by the reproduction integrated circuit 501 and sent to the reproduced signal rotary transformer 8 and the buffer amplifier 11 for later signal processing.

The rotary transformer 13, which transfers data between the fixed side and the rotary side, comprises the power rotary transformer 10, reproduced signal rotary transformer 8, and control signal rotary transformer 9. The MR head information signal, generated by the control data generation circuit 12, is transmitted to the rotary side via the control signal rotary transformer 9. The decoder 6 identifies the data of this signal to control the operation of the reproduction integrated circuit 501. Because the circuit components of the reproduction integrated circuit 501 and the decoder 6 are installed in the rotary side in this configuration, the power supply circuit 3 is provided on the rotary drum 1. The power supply circuit 3, composed of a rectifier circuit and a voltage stabilizer circuit, receives a desired dc current from the ac signal output from the power signal generation circuit 7 transmitted via the power rotary transformer 10.

The reproduction integrated circuit 501 provides two current circuits supplying a bias current to the MR heads, 201 and 301, and two reproduction amplifiers, one channel for each MR head. The operation mode of the reproduction integrated circuit 501, including the reproduction amplifier gain, head switching switch, and MR head bias current, are controlled by three control lines, for example, DATA, Clock, and Chip Select. Because these three control signals are sent as a sequence of digital signals, the decoder 6 has the oscillating circuit 15 for generating digital signals. The decoder 6 identifies control data transmitted from the control data generation circuit 12, converts the control data to digital control data for use in the reproduction integrated circuit 501, and then outputs the converted data. This configuration allows the three control lines to be used even when the number of the MR head 201 and 203 is increased and the number of reproduction integrated circuits 501 is increased. Note that the Chip Select lines are required, one for each reproduction integrated circuit 501. The oscillation frequency of the oscillating circuit 15, dependent on the type and the number of reproduction integrated circuits 501 that are used, is about 10–30 MHz.

In FIG. 1, if the control data generation circuit 12 simultaneously supplies a signal that switches the reproduction integrated circuit 501 every 180 degrees, the decoder 6 identifies this data, switches the reproduction integrated circuit 501 composed of two channels of amplifier, selects one of output signals from the MR heads 201 and 203, and transmits the selected output signal to the buffer amplifier 11 in the fixed side via the reproduced signal rotary transformer 8. This configuration enables one-channel reproduced signal rotary transformer 8 to transmit output signals from the two MR heads 201 and 203.

The tape checking circuit 14 checks the output signal from the tape checking sensor circuit 4 to check the type of a tape currently mounted on the apparatus. The type of tape refers to the magnetic layer thickness or the tape length that may be checked by the open/close of detection holes on the tape cartridge in which a magnetic tape is stored. For example, when three detection holes are used, a maximum of eight types of tape may be checked.

The magnetic layer thickness is a major factor affecting the reproduction output and the reproduction output level ratio depends largely on the magnetic layer thickness. When a tape cartridge is inserted into the apparatus, the tape checking sensor circuit 4 and the tape checking circuit 14 start checking if the tape is a high-density tape or a low-density tape. Based on the checking result, the control data generation circuit 12 generates a control signal for setting a predetermined amplifier gain and transmits the generated control signal to the rotary side via the control signal rotary transformer 9. The decoder 6 identifies the data of this signal to execute the gain setting operation of the reproduction integrated circuit 501.

This configuration allows the reproduction integrated circuit 501 to set a gain quickly without having to reproduce an inserted magnetic tape.

Figure 2:
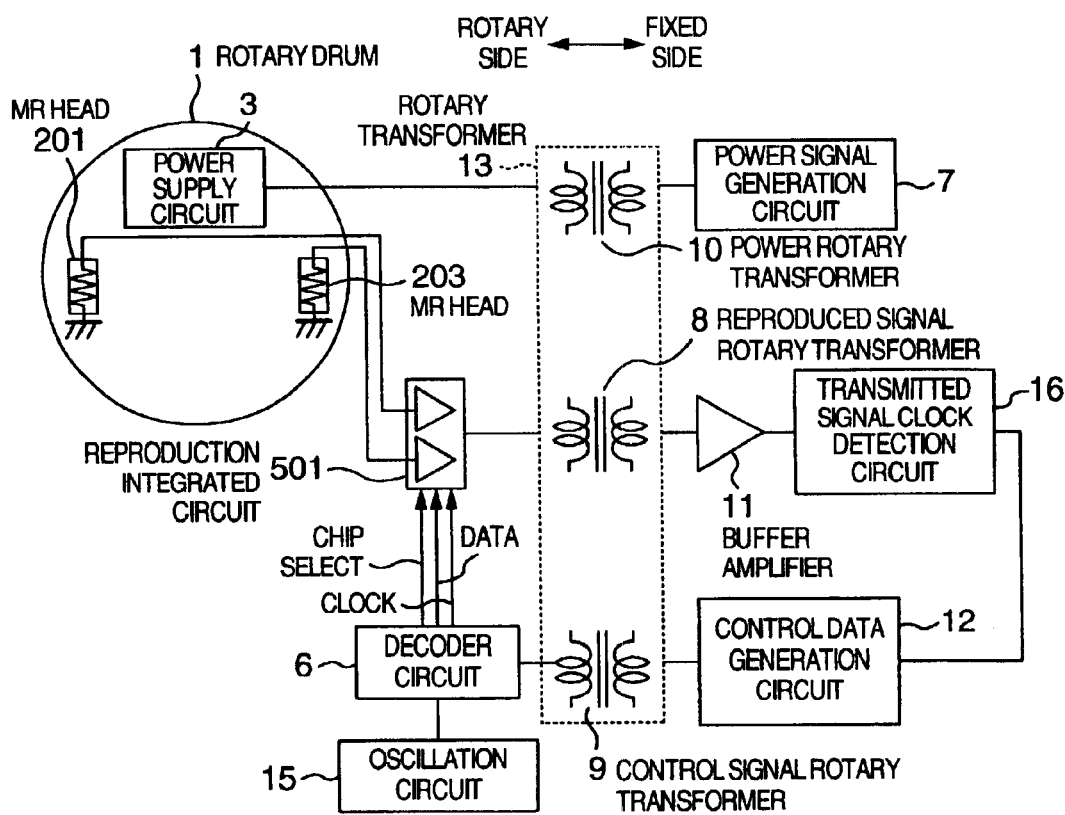
FIG. 2 is a block diagram showing another embodiment of a digital information reproducing apparatus using rotary magnetic heads according to the present invention.

FIG. 2 is a block diagram showing another embodiment of a digital information reproducing apparatus using rotary magnetic heads according to the present invention. In FIG. 2, the same reference numerals as those in FIG. 1 denote the same structural elements. The apparatus further comprises a transmitted signal clock detection circuit 16.

In general, the transmission rate of the system differs between high-density recording and low-density recording. When a recorded magnetic tape is reproduced, the reproduction clock frequency of high-density recording detected by a PLL circuit and so on is higher than that of low-density recording. Therefore, the recording density may be determined based on the frequency detected by the transmitted signal clock detection circuit 16 shown in FIG. 2. The control data generation circuit 12 generates a control signal, which will be used to set a predetermined amplifier gain, and transmits the generated control signal to the rotary side via the control signal rotary transformer 9. The decoder 6 identifies the data of this signal to cause the reproduction integrated circuit 501 to do the gain setting operation.

In this configuration, the tape checking sensor circuit 4 shown in FIG. 1 is not necessary. An existing PLL circuit may be used as the transmitted signal clock detection circuit 16 and, therefore, the circuit becomes simplified.

Figure 3:
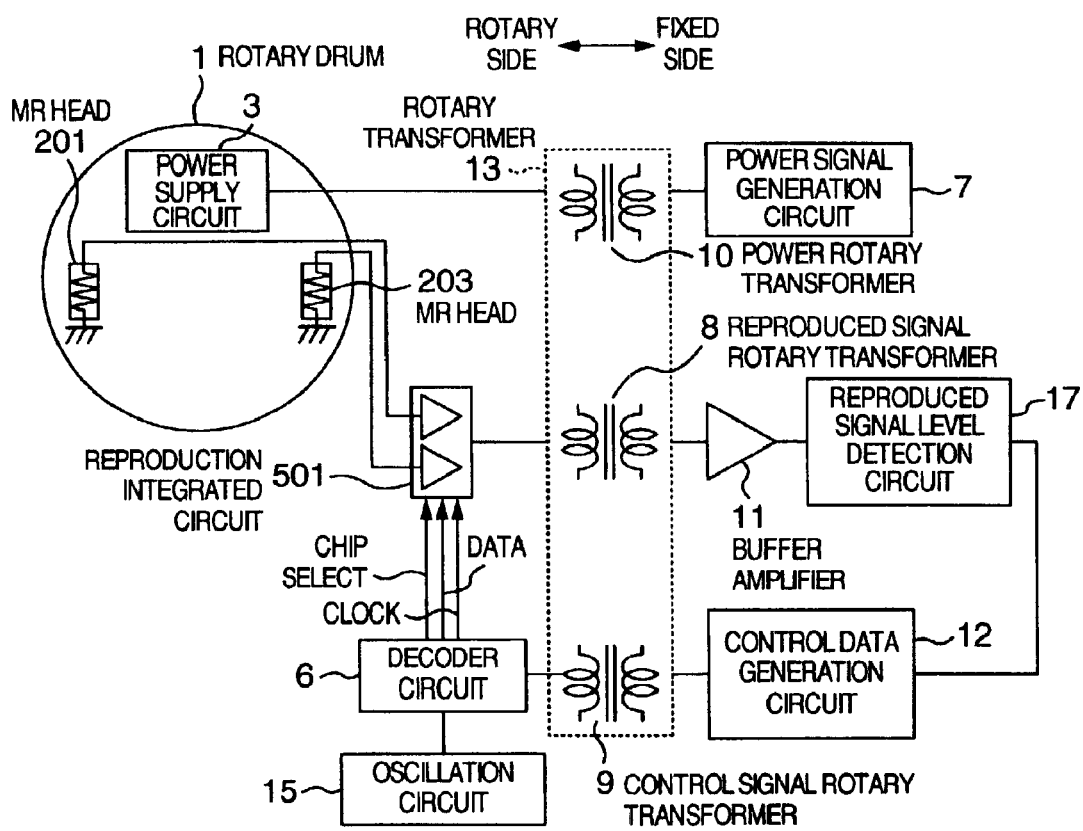
FIG. 3 is a block diagram showing still another embodiment of a digital information reproducing apparatus using rotary magnetic heads according to the present invention.

FIG. 3 is a block diagram showing still another embodiment of a digital information reproducing apparatus using rotary magnetic heads according to the present invention. In FIG. 3, the same reference numerals as those in FIGS. 1 and 2 denote the same structural elements. The apparatus further comprises a reproduced signal level detection circuit 17.

When a magnetic tape is reproduced, the reproduced signal level of a low-frequency area on a low-density recording tape is higher than that of a high-density recording tape. Therefore, the recording density may be determined based on the result detected by the reproduced signal level detection circuit 17. The control data generation circuit 12 generates a control signal, which will be used to set a pre-determined amplifier gain, and transmits the generated signal to the rotary side via the control signal rotary transformer 9. The decoder 6 identifies the data of this signal to cause the reproduction integrated circuit 501 to do the gain setting operation.

A digital tape streamer unit typically converts analog output signals received from the reproducing head to digital signals with an A/D converter for use in later signal processing. In this configuration, because an existing A/D converter may be used as the reproduced signal level detection circuit 17, the circuit becomes simpler. Unlike the apparatus in the embodiments in FIGS. 1 and 2 described above, the apparatus in this embodiment senses the level of the reproduced signal itself. Therefore, not only when a low-density tape is reproduced but also when the MR head has worn and the output level is increased, this embodiment gives an effect that the amplifier gain may be increased as long as signals are not clipped. Another effect is that, rather than a single amplifier gain value, the value may be switched every 180-degree period of the rotary drum to set an optimum amplifier gain value for each of the MR heads 201 and 203.

Figure 4:
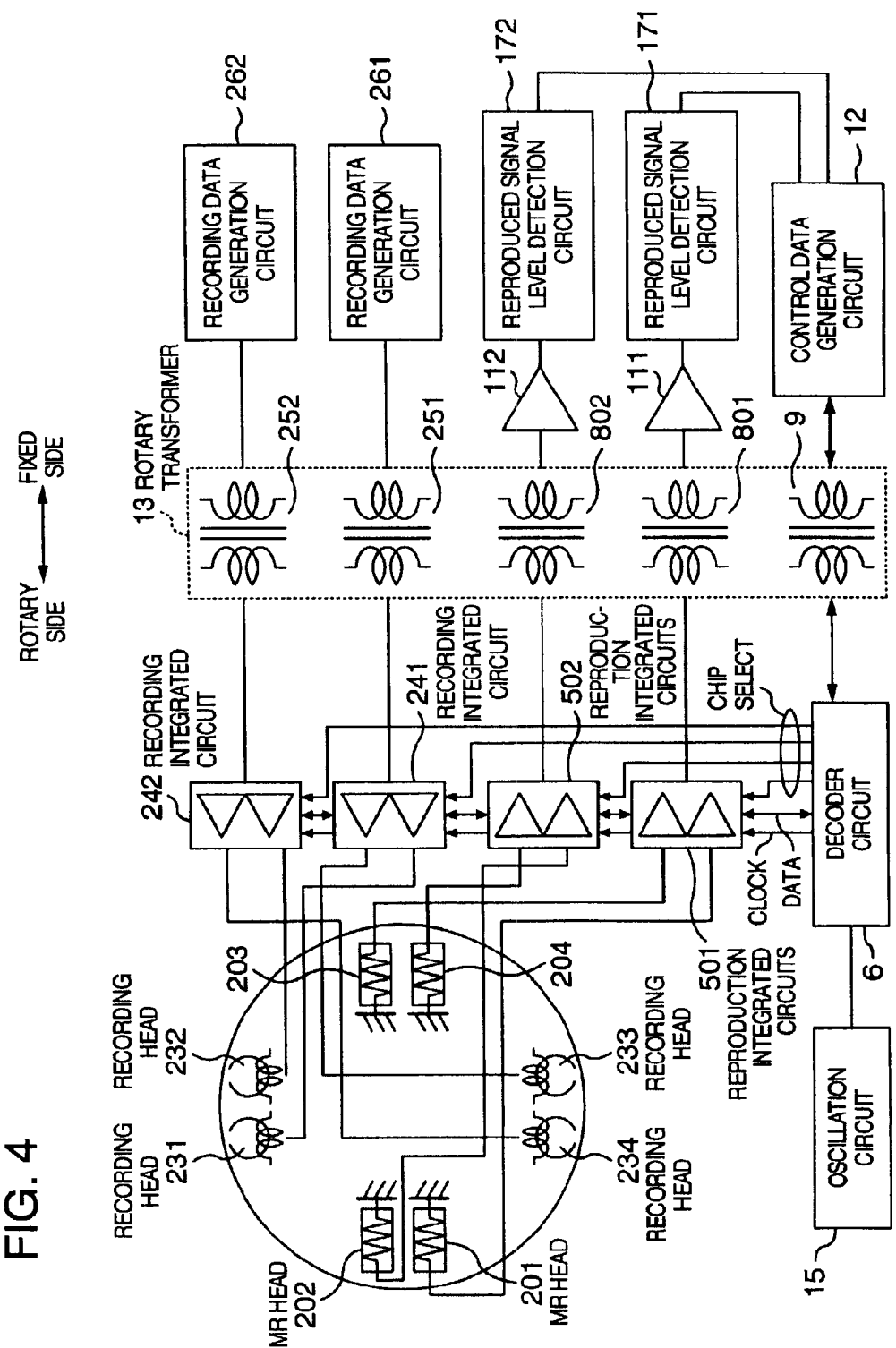
FIG. 4 is a block diagram showing still another embodiment of a digital information reproducing apparatus using rotary magnetic heads according to the present invention.

FIG. 4 shows still another embodiment of a digital information reproducing apparatus using rotary magnetic heads according to the present invention. In FIG. 4, the same reference numerals as those in FIGS. 1, 2, and 3 denote the same structural elements. The apparatus comprises MR heads 201, 202, 203, and 204, reproduced signal rotary transformers 801 and 802, recording heads 231, 232, 233, and 234, recording integrated circuits 241 and 242, recording data rotary transformers 251 and 252, recording data generation circuits 261 and 262, buffer amplifiers 111 and 112, reproduction integrated circuits 501 and 502, and reproduced signal level detection circuits 171 and 172. In this embodiment, the apparatus has four recording heads and four MR heads. By creating two pairs of recording heads and reproducing heads, a DA (Double Azimuth) configuration with different azimuth angles is built to double the data transfer speed.

Referring to FIG. 4, the recording head is composed of a pair of recording heads 231 and 232 and a pair of recording heads 233 and 234, and the MR head is composed of a pair of MR heads 201 and 202 and a pair of MR heads 203 and 204. The recording heads 231, 232, 233, and 234 and the MR heads 201, 202, 203, and 204 are arranged at a 90-degree interval, respectively. The recording heads 231 and 233, recording heads 232 and 234, MR heads 201 and 203, and MR heads 202 and 204 are diametrically opposed each other. The heights of the heads are adjusted so that the MR heads 201, 202, 203, and 204 can reproduce data from data tracks on a magnetic tape on which data is recorded by the recording heads 231, 232, 233, and 234.

Data signals simultaneously output to two paths, one from the recording data generation circuit 261 and the other from 262, are recorded on a magnetic tape via the recording data rotary transformer 251 or 252, recording integrated circuit 241 or 242, and a pair of recording heads 231 and 232 or 233 and 234. At reproduction time, the signals reproduced from a pair of MR heads 201 and 202 or 203 and 204 are transmitted to the fixed side via the reproduction integrated circuit 501 or 502 and the buffer amplifier 111 or 112. The recording integrated circuits 241 and 242 and the reproduction integrated circuits 501 and 502 are controlled by three types of digital signals, DATA, Clock, and Chip Select, as in the embodiment shown in FIG. 1.

Because the apparatus in FIG. 4 has two recording integrated circuits, 241 and 242, and two reproduction integrated circuits, 501 and 502, a total of four Chip Select (CS) lines, to which signals are output from the decoder 6, are provided. The reproduction integrated circuit 501 and 502, which have an MR head bias current supply circuit, controls the MR head bias current value, amplifier gain, and head switching switch. The recording integrated circuits 241 and 242 controls the head switching switch and recording current value.

These data is generated by the control data generation circuit 12 and then transmitted to the decoder 6 via the control signal rotary transformer 9. In response to this information data, the decoder 6 generates control data for the recording integrated circuits 241 and 242 and the reproduction integrated circuit 501 and 502 and controls those circuits via the six control lines described above. Those data output signals are generated by oscillation clocks generated by the oscillating circuit 15.

The operation of the reproduced signal level detection circuits 171 and 172 is the same as that of the circuits in the embodiment shown in FIG. 3. In this configuration, the gain amplifier for the four MR heads 201, 202, 203, and 204 installed on the rotary drum 1 may be optimally adjusted independently and, therefore, the variations in the initial sensitivity of the MR heads may be corrected.

Although the recording integrated circuits, 241 and 242, and the reproduction integrated circuits, 501 and 502, are separated in the above description, those circuits may be configured as an integrated circuit for both recording and reproduction where the three control lines described above are used to switch the recording/reproduction function.

Although some embodiments of the present invention have been described above individually, those embodiments may be combined; for example, the method using the tape checking circuit 14 shown in FIG. 1 and the method using the reproduced signal level detection circuit 17 shown in FIG. 3 may be combined to control the operation. Finally, an ability to measure the error rate status, if added, would increase the setting reliability.

As described above, the apparatus according to the present invention allows the fixed side to optimally control the gain of the reproduction amplifier circuit provided for an MR head on a rotary drum. This capability makes it to provide a digital information reproducing apparatus using rotary magnetic heads that has a reproduction system giving stable, good signals independently of tape types or head wear.

The invention may be embodied in other specific forms without departing from the spirit or essential characteristics thereof. The present embodiment is therefore to be considered in all respects as illustrative and not restrictive, the scope of the invention being indicated by the appended claims rather than by the forgoing description and range of equivalency of the claims are therefore intended to be embraced therein.

What is claimed is:

1. A digital information reproducing apparatus using rotary magnetic heads that reproduces an information signal recorded on a magnetic tape, wherein magneto resistive heads, a current supply circuit supplying an operating current to said magneto resistive heads, and a reproduction amplifier circuit amplifying a signal reproduced by said magneto resistive heads are installed on a rotary drum, said apparatus comprising:

a magnetic tape checking circuit installed in a fixed side of said apparatus that, when a magnetic tape to be reproduced is mounted on said apparatus, checks an open/close status of detection holes on a tape cartridge to determine a type of the magnetic tape, said tape cartridge storing therein the magnetic tape;

a control signal generation circuit installed in the fixed side of said apparatus that generates a control signal for controlling a gain of said reproduction amplifier circuit; and a decoder circuit installed on said rotary drum that identifies data of the control signal transmitted from said control signal generation circuit;

wherein said control signal generation circuit generates the control signal based on a checking result given by said magnetic tape checking circuit and said decoder circuit identifies the transmitted control signal to control the gain of said reproduction amplifier circuit.

2. A digital information reproducing apparatus using rotary magnetic heads that reproduces an information signal recorded on a magnetic tape, wherein magneto resistive heads, a current supply circuit supplying an operating current to said magneto resistive heads, and a reproduction amplifier circuit amplifying a signal reproduced by said magneto resistive heads are installed on a rotary drum, said apparatus comprising:

a transmitted signal clock detection circuit installed in a fixed side of said apparatus that detects a clock frequency of a signal transmitted from said reproduction amplifier circuit;

a control signal generation circuit installed in the fixed side of said apparatus that generates a control signal for controlling a gain of said reproduction amplifier circuit; and a decoder circuit installed on said rotary drum that identifies data of the control signal transmitted from said control signal generation circuit;

wherein said control signal generation circuit generates the control signal based on a detection result given by said transmitted signal clock detection circuit and said decoder circuit identifies the transmitted control signal to control the gain of said reproduction amplifier circuit.

3. A digital information reproducing apparatus using rotary magnetic heads that reproduces an information signal recorded on a magnetic tape, wherein magneto resistive heads, a current supply circuit supplying an operating current to said magneto resistive heads, and a reproduction amplifier circuit amplifying a signal reproduced by said magneto resistive heads are installed on a rotary drum, said apparatus comprising:

a signal level detection circuit installed in a fixed side of said apparatus that detects an output level of a signal transmitted from said reproduction amplifier circuit;

a control signal generation circuit installed in the fixed side of said apparatus that generates a control signal for controlling a gain of said reproduction amplifier circuit; and a decoder circuit installed on said rotary drum that identifies data of the control signal transmitted from said control signal generation circuit;

wherein said control signal generation circuit generates the control signal based on a detection result given by said signal level detection circuit and said decoder circuit identifies the transmitted control signal to control the gain of said reproduction amplifier circuit.

4. The digital information reproducing apparatus using rotary magnetic heads according to claim 3, wherein said signal level detection circuit includes an A/D (Analog to Digital) converter.

5. The digital information reproducing apparatus using rotary magnetic heads according to claim 1, wherein at least two said magneto resistive heads are installed on said rotary drum, diametrically opposed each other, and the magnetic tape is wound around said rotary drum approximately 180 degrees and wherein said control signal generation circuit generates the control signal for each period for which said magneto resistive heads are in touch with the magnetic tape and said decoder circuit controls the gain of said reproduction amplifier circuit for each of the magneto resistive heads that reproduce the tape.

6. The digital information reproducing apparatus using rotary magnetic heads according to claim 2, wherein at least two said magneto resistive heads are installed on said rotary drum, diametrically opposed each other, and the magnetic tape is wound around said rotary drum approximately 180 degrees and wherein said control signal generation circuit generates the control signal for each period for which said magneto resistive heads are in touch with the magnetic tape and said decoder circuit controls the gain of said reproduction amplifier circuit for each of the magneto resistive heads that reproduce the tape.

7. The digital information reproducing apparatus using rotary magnetic heads according to claim 3, wherein at least two said magneto resistive heads are installed on said rotary drum, diametrically opposed each other, and the magnetic tape is wound around said rotary drum approximately 180 degrees and wherein said control signal generation circuit generates the control signal for each period for which said magneto resistive heads are in touch with the magnetic tape and said decoder circuit controls the gain of said reproduction amplifier circuit for each of the magneto resistive heads that reproduce the tape.

8. A digital information reproducing apparatus using rotary magnetic heads that reproduces an information signal recorded on a magnetic tape, wherein magnetic heads and a reproduction amplifier circuit amplifying a signal reproduced by said magnetic heads are installed on a rotary drum, said apparatus comprising:

a magnetic tape checking circuit installed in a fixed side of said apparatus that, when a magnetic tape to be reproduced is mounted on said apparatus, checks an open/close status of detection holes on a tape cartridge to determine a type of the magnetic tape, said tape cartridge storing therein the magnetic tape;

a control signal generation circuit installed in the fixed side of said apparatus that generates a control signal for controlling a gain of said reproduction amplifier circuit; and a decoder circuit installed on said rotary drum that identifies data of the control signal transmitted from said control signal generation circuit;

wherein said control signal generation circuit generates the control signal based on a checking result given by said magnetic tape checking circuit, wherein the control signal is transmitted to said decoder circuit via a rotary transformer, and wherein said decoder circuit identifies the transmitted control signal to control the gain of said reproduction amplifier circuit.

9. A digital information reproducing apparatus using rotary magnetic heads that reproduces an information signal recorded on a magnetic tape, wherein magnetic heads and a reproduction amplifier circuit amplifying a signal reproduced by said magnetic heads are installed on a rotary drum, said apparatus comprising:

a transmitted signal clock detection circuit installed in a fixed side of said apparatus that detects a clock frequency of a signal transmitted from said reproduction amplifier circuit;

a control signal generation circuit installed in the fixed side of said apparatus that generates a control signal for controlling a gain of said reproduction amplifier circuit; and a decoder circuit installed on said rotary drum that identifies data of the control signal transmitted from said control signal generation circuit;

wherein said control signal generation circuit generates the control signal based on a detection result given by said transmitted signal clock detection circuit, wherein the control signal is transmitted to said decoder circuit via a rotary transformer, and wherein said decoder circuit identifies the transmitted control signal to control the gain of said reproduction amplifier circuit.

10. A digital information reproducing apparatus using rotary magnetic heads that reproduces an information signal recorded on a magnetic tape, wherein magnetic heads and a reproduction amplifier circuit amplifying a signal reproduced by said magnetic heads are installed on a rotary drum, said apparatus comprising:

a signal level detection circuit installed in a fixed side of said apparatus that detects an output level of a signal transmitted from said reproduction amplifier circuit;

a control signal generation circuit installed in the fixed side of said apparatus that generates a control signal for controlling a gain of said reproduction amplifier circuit; and a decoder circuit installed on said rotary drum that identifies data of the control signal transmitted from said control signal generation circuit;

wherein said control signal generation circuit generates the control signal based on a detection result given by said signal level detection circuit, wherein the control signal is transmitted to said decoder circuit via a rotary transformer, and wherein said decoder circuit identifies the transmitted control signal to control the gain of said reproduction amplifier circuit.

* * * * *